(12) United States Patent
Wu

(10) Patent No.: US 8,380,955 B1
(45) Date of Patent: Feb. 19, 2013

(54) METHOD AND SYSTEM FOR NAMING REPLICATED STORAGE

(75) Inventor: Stephen Wu, Sacramento, CA (US)

(73) Assignee: Netapp, Inc., Sunnyvale, CA (US)

( * ) Notice: Subject to any disclaimer, the term of this patent is extended or adjusted under 35 U.S.C. 154(b) by 274 days.

(21) Appl. No.: 12/978,202

(22) Filed: Dec. 23, 2010

(51) Int. Cl.
*G06F 12/02* (2006.01)
(52) U.S. Cl. .................. 711/162; 711/171; 711/202
(58) Field of Classification Search .................. None
See application file for complete search history.

(56) References Cited

U.S. PATENT DOCUMENTS

| | | | |
|---|---|---|---|
| 2010/0077160 A1* | 3/2010 | Liu et al. ................. | 711/162 |
| 2011/0078494 A1* | 3/2011 | Maki et al. .............. | 714/6.12 |
| 2012/0084521 A1* | 4/2012 | Fukui et al. ............. | 711/162 |
| 2012/0226855 A1* | 9/2012 | Dhuse ..................... | 711/114 |

* cited by examiner

*Primary Examiner* — Than Nguyen
(74) *Attorney, Agent, or Firm* — Klein, O'Neill & Singh, LLP

(57) ABSTRACT

Method and system for uniquely identifying a replicated copy of a storage volume is provided. A unique identifier is created by a storage system managing the replicated copy. The unique identifier includes a time stamp of when the identifier is being created, a system clock of the storage system and a unique address for an adapter that is used by the storage system.

27 Claims, 10 Drawing Sheets

SNAPSHOT TABLE 408

| ID 400 | NAME 402 | CREATION_TIME 404 | ATTRIBUTE 406 |
|---|---|---|---|
| 0 | | | |
| 1 | | | |
| ⋮ | | | |
| ⋮ | | | |
| 255 | | | |

FIG. 4

STRIPED VOLUME 500

| STRIPE | DISK 1 | DISK 2 | ••••• | DISK n |
|---|---|---|---|---|
| STRIPE 1 | | | | |
| ⋮ | | | | |
| STRIPE n | | | | |

FIG. 5

METHOD AND SYSTEM FOR NAMING REPLICATED STORAGE

TECHNICAL FIELD

The present disclosure relates to storage systems.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client processing systems ("clients"). The storage operating system stores and manages shared data containers in a set of mass storage devices, such as magnetic or optical disks or tapes.

Information stored at storage devices may be frequently replicated. Managing and uniquely naming the replicated copies can be challenging as storage systems span across networks and data centers. Conventional systems typically use a limited number of identifiers for identifying replicated copies. The identifiers are recycled when a replicated copy is deleted. This is an undesirable limitation since the numbers of replicated copies continue to grow in today's data centers. Continuous efforts are being made to efficiently manage replicated storage copies.

SUMMARY

In one embodiment, a method and system for uniquely identifying a replicated copy of a storage volume is provided. A unique identifier is generated by a storage system managing the replicated copy. The unique identifier includes a time stamp of when the unique identifier is being created, a system clock of the storage system and a unique address for an adapter that is used by the storage system.

In another embodiment, a machine implemented method for translating an identifier of a replicated copy of a storage volume is provided. A unique identifier for the storage volume is first generated. The unique identifier of the storage volume includes a time stamp based on when the unique identifier is being generated, an original identifier that identifies the storage volume of the replicated copy, a system clock of a storage system managing the storage volume, and a unique address of an adapter used by the storage system.

Thereafter, a first identifier for the replicated copy is derived from the unique identifier for the storage volume by replacing the original identifier of the storage volume with an original logical identifier for the replicated copy. A second identifier for the replicated copy is also derived from the unique identifier for the storage volume by replacing the original identifier of the storage volume with an original physical identifier of the replicated copy and replacing the time stamp of the unique storage volume identifier with an original time stamp of the replicated copy.

In yet another embodiment, a machine implemented method for translating an identifier of a replicated copy of a storage volume is provided. A unique identifier for the storage volume having a time stamp value based on when the unique identifier is being generated, an original identifier that identifies the storage volume of the replicated copy, a system clock of a storage system managing the storage volume, and a unique address of an adapter used by the storage system is provided.

A first identifier for the replicated copy is derived from the unique identifier for the storage volume by replacing the original identifier of the storage volume with an original logical identifier for the replicated copy. The replicated copy is also identified with a second identifier derived from the unique identifier of the storage volume by replacing the original identifier of the storage volume with an original physical identifier of the replicated copy and replacing the time stamp of the unique storage volume identifier with an original time stamp of the replicated copy.

In another embodiment, a machine implemented method for translating an identifier of a replicated copy of a storage volume is provided. A first identifier for the replicated copy is generated having an original logical identifier of the replicated copy; a time stamp based on when a unique identifier for the storage volume is generated, a system clock for the storage system accessing the storage volume, and a unique address of an adapter used by the storage system. An original physical identifier of the replicated copy and an original time stamp of the replicated copy is used for identifying the replicated copy with a second identifier.

In yet another embodiment, a machine implemented method for uniquely identifying a replicated copy of a storage volume is provided. The method includes providing a first component of a unique identifier having a time stamp value indicating a time when the unique identifier is being generated; using a system clock value generated by a storage system that manages the replicated copy for identifying a second component of the unique identifier; and generating a third component of the unique identifier having a unique address of a network adapter used by the storage system.

In another embodiment, a system for translating an identifier of a replicated copy of a storage volume is provided. The system includes a first storage system identifying the replicated copy using an original logical identifier of the replicated copy and an original physical identifier of the replicated copy.

The system also includes a second storage system translating the identifier of the replicated copy to generate a first identifier for the replicated copy having the original logical identifier of the replicated copy; a time stamp based on when a unique identifier for the storage volume is generated, a system clock for the second storage system and a unique address of an adapter used by the second storage system; and using the original physical identifier of the replicated copy and the original time stamp of the replicated copy for generating a second identifier for the replicated copy.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures:

FIG. 4 shows an example of a snapshot table used according to one embodiment;

FIG. 5 shows an example of striped volume, used according to one embodiment;

DETAILED DESCRIPTION

Figure 1A:
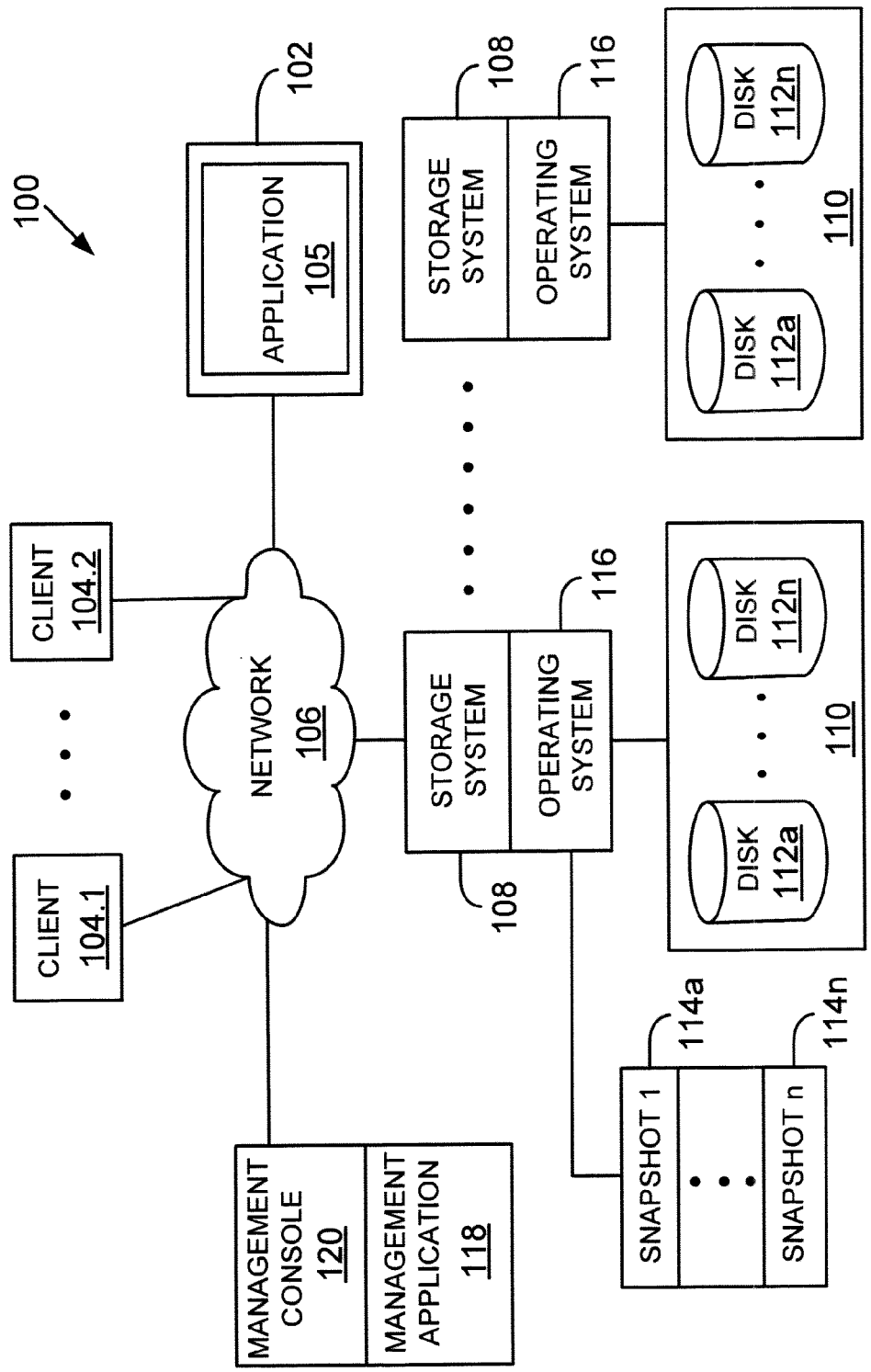
FIG. 1A shows a block diagram of a non-cluster based storage system, used according to one embodiment.

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

In one embodiment, a method and system for uniquely identifying a replicated copy of a storage volume is provided. A unique identifier is created by a storage system managing the replicated copy. The unique identifier includes a time stamp of when the unique identifier is being generated, a system clock of the storage system and a unique address for an adapter that is used by the storage system.

In another embodiment, a machine implemented method for renaming a replicated copy of a storage volume is provided. A unique identifier for the storage volume is first generated. The unique identifier of the storage volume includes a time stamp based on when the unique identifier is being generated, an original identifier that identifies the storage volume of the replicated copy, a system clock of a storage system managing the storage volume, and a unique address of an adapter used by the storage system.

Thereafter, a first identifier for the replicated copy is derived from the unique identifier for the storage volume by replacing the original identifier for the storage volume with an original logical identifier for the replicated copy. A second identifier for the replicated copy is also derived from the unique identifier of the storage volume by replacing the original identifier of the storage volume with an original physical identifier of the replicated copy and replacing the time stamp of the unique storage volume identifier with an original time stamp of the replicated copy.

Storage Environment:

FIG. 1A shows an example of a non-cluster based storage environment 100 where the various embodiments disclosed herein may be implemented. Storage environment 100 is used to store a plurality of data containers across a plurality of storage devices. The term data container as used herein means a file, a logical unit of data or any other information.

Storage environment 100 may include a plurality of storage systems 108, each coupled to a storage subsystem 110. Each storage subsystem 110 may include multiple mass storage devices 112a-112n (may also be referred to as storage device 112 or storage devices 112) that may be used to store a plurality of data containers. The mass storage devices 112 may be, for example, conventional magnetic disks, optical disks such as CD-ROM or DVD based storage, magneto-optical (MO) storage, flash memory storage device or any other type of non-volatile storage devices suitable for storing data. The storage devices 112 in each storage subsystem 110 can be organized into one or more redundant array of inexpensive disks ("RAID") groups, in which case the corresponding storage system 108 accesses the storage subsystem 110 using an appropriate RAID protocol.

Each storage system 108 may operate as a network attached storage (NAS) based file server, a block-based storage server such as used in a storage area network (SAN), or a combination thereof, or a node in a clustered environment described below with respect to FIG. 2, or any other type of storage server. Note that certain storage systems from NetApp Inc., the assignee of the present application, are capable of providing clients with both file-level data access and block-level data access.

Storage environment 100 may also include a plurality of client systems 104.1-104.2 (may also be referred to as client 104 or clients 104), a management console 120 and at least one network 106 communicably connecting the clients 104, storage systems 108 and management console 120. Clients 104 may be general purpose computers, connected to the storage systems 108 via the computer network 106, such as a packet-switched network.

Processors executing instructions in storage systems 108, for example, operating system 116, and clients 104 communicate according to well-known protocols, such as the NFS protocol or the CIFS protocol, to make data stored on disk 112 appear to users and/or application programs as though the data were stored locally on the client systems 104. CIFS means the standard Common Internet File System Protocol, an access protocol that client systems typically use to request file access services from storage systems over a network. NFS means Network File System, a standard protocol that allows a user to access storage over a network.

The operating system 116 can present or export data stored on disks 112 as a volume to each client 104. Each volume may be configured to store data files, scripts, word processing documents, executable programs, and the like.

The term volume as used herein is a logical data set which is an abstraction of physical storage, combining one or more physical mass storage devices (e.g., disks) or parts thereof into a single logical storage object, and which is managed as a single administrative unit, such as a single file system. A volume is typically defined from a larger group of available storage, such as an "aggregate".

The term aggregate as used herein is a logical aggregation of physical storage, i.e., a logical container for a pool of storage, combining one or more physical mass storage devices (e.g., disks) or parts thereof into a single logical storage object, which includes or provides storage for one or more other logical data sets at a higher level of abstraction (e.g., volumes).

From the perspective of one of the client systems 104.1-104.2, each volume can appear to be a single disk drive. However, each volume can represent the storage space in one disk, an aggregate of some or all of the storage space in multiple disks, a RAID group, or any other suitable set of storage space.

The storage volumes used herein may also be "striped". An example of a striped volume is described in detail below with respect to FIG. 4. Briefly, a striped volume is a volume that includes a plurality of addressable stripes. When data is stored to a stripe, it may be physically stored across multiple disks. Striped volumes are commonly used in a cluster based storage environment that is described below in detail with respect to FIG. 2.

Referring back to FIG. 1A, in a typical mode of operation, one of the client systems 104 transmits one or more input/output commands, such as an NFS or CIFS request, over the computer network 106 to one of the storage systems 108. The operating system 116 receives the request, issues one or more I/O commands to storage device 112 to read or write the data on behalf of the client system 104, and issues an NFS or CIFS response containing the requested data over the network 106 to the respective client system 104.

The management console 120 shown in system 100 executes storage management application (may also be referred to as management application) 118 may be, for example, a conventional PC, workstation, or the like. In another embodiment, management application 118 may also be executed by storage system 108.

The management application 118 may be a module with executable instructions, typically used by a storage network administrator to manage a pool of storage devices 112. Management application 118 enables the administrator to perform various operations, such as monitoring and allocating storage space in the storage pool, creating and deleting volumes, directories and others.

Communication between the storage management application 118, clients 104 and operating system 116 may be accomplished using any of the various conventional communication protocols and/or application programming interfaces (APIs), the details of which are not germane to the technique being introduced here. This communication can be implemented through the network 106 or it can be via a direct link (not shown) between the management console 120 and one or more of the storage systems 108.

One or more other storage-related applications 105 may also be operatively coupled to the network 106, residing and executing in one or more other computer systems 102. Examples of such other applications 105 include data backup software, snapshot management software and others. It is noteworthy that these applications may also be executed by storage system 108 or any other computing system.

Information stored at storage volumes that are presented by the operating system 116 is often replicated for disaster recovery, redundancy and other reasons. There are different techniques that may be used to replicate information stored at storage volumes. One such technique is by taking snapshots (without derogation to any trademark rights of NetApp, Inc.). A snapshot is a persistent point in time image of a file system that enables quick recovery of data after data has been corrupted, lost, or altered. Snapshots can be created by copying the data at each predetermined point in time to form a consistent image.

Typically, a snapshot is initiated by an application 105 (for example, SnapManager® provided by Netapp Inc.) that sends a snapshot request to operating system 116. The snapshot request may be sent via an interface (not shown) (for example, SnapDrive® provided by Netapp Inc.) or directly.

Based on the snapshot request, the operating system 116 obtains information regarding one or more storage volumes and then replicates the affected volumes. Various snapshots 114a-114n may be taken at different times and then stored and managed by operating system 116. The details of creating the snapshots are not described in detail since they are not germane to the inventive embodiments.

One challenge in managing snapshots 114a-114n is the mechanism by which snapshots are identified. In conventional systems, a certain number of identifiers, for example, 1 to 255, are used by the operating system 116 to identify a snapshot. The operating system 116 first uses all the 255 identifiers. Once all the 255 identifiers have been used, operating system 116 reuses identifiers after a snapshot using a particular identifier is deleted. For example, a snapshot maybe identified by using identifier 1. When the snapshot identified by identifier 1 is deleted, then operating system 116 can re-use identifier 1 for identifying another snapshot.

This approach of recycling snapshot identifiers has shortcomings. For example, operating system 116 can only uniquely identify 255 snapshots. Another shortcoming is evident from the following example: a first request to rename a snapshot identified by identifier 5 is sent by a client 104 to operating system 116. While the first request is in transit, operating system 116 gets another request to delete the snapshot identified by identifier 5. The operating system 116 deletes the snapshot with identifier 5 and reuses identifier 5 to name another snapshot.

Thereafter, the original request is received and operating system 116 renames a different snapshot, i.e., the new snapshot identified by identifier 5. This is an undesirable situation because not only one can rename a wrong snapshot one may also delete a wrong snapshot by mistake.

The embodiments disclosed herein provide a mechanism for uniquely and efficiently identifying snapshots without having to recycle identifiers.

Figure 1B:
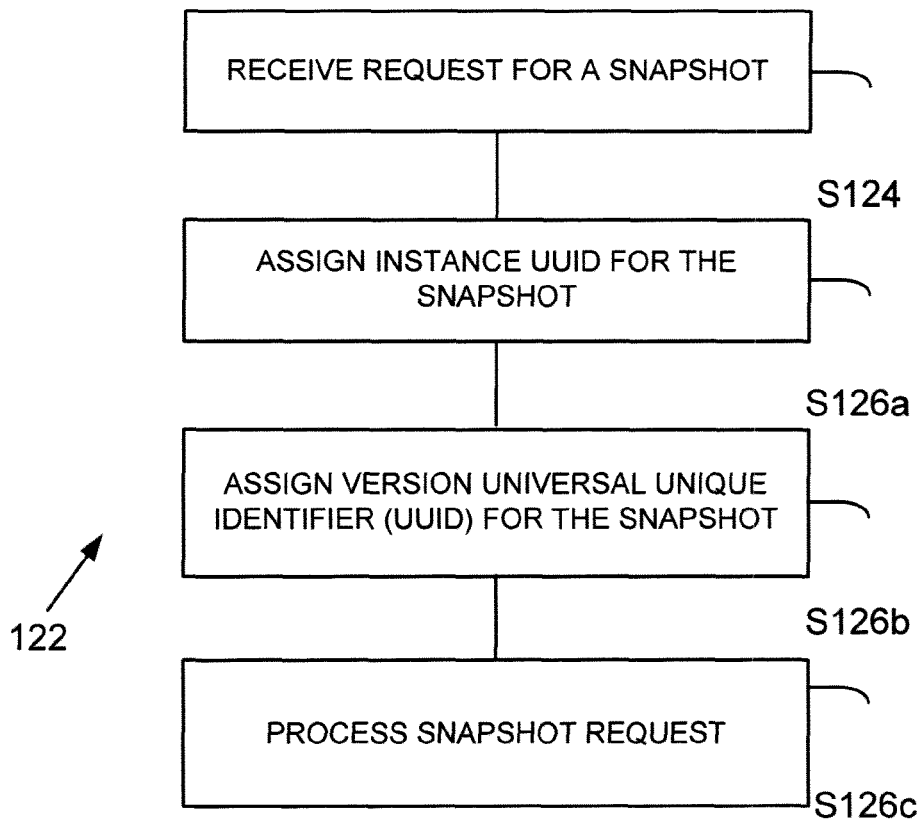
FIG. 1B shows a process flow diagram for generating a unique identifier for a snapshot, according to one embodiment.

FIG. 1B shows a high-level process flow 122 for identifying a snapshot, according to one embodiment. The process begins in block S124, when a request for taking a snapshot for a storage volume is received by operating system 116. The request may be sent by any processor executable application. The snapshot request may be for a storage volume in a non-cluster based environment of FIG. 1A or for a striped volume in a cluster based environment that is described below in more detail with respect to FIG. 2. The snapshot request may be for a new snapshot or for replicating an existing snapshot (may also be referred to as a source snapshot).

In block S126a, an instance UUID (may also be referred to as "instance identifier") is assigned for the requested snapshot. The instance UUID identifies the snapshot and its physical data layout. If any two snapshots have the same instance UUID, then they are a different instance of the same snapshot, i.e. a same data block appears at the same exact physical location, for example, a physical volume block number used for managing the physical storage space.

In block S126b, a version unique universal identifier (UUID) is assigned for the requested snapshot. The version UUID (may also be also referred to as "version identifier") is used to identify a snapshot and its logical data layout. If any two snapshots have the same version UUID, then their contents may be logically equivalent.

The version UUID may be provided by the request of block S124, for example, if the request is for replicating a source snapshot. The version UUID used for replicating the source snapshot is the same as the version UUID of the source snapshot. In this case, operating system 166 uses the version UUID that is included with the request.

If no version UUID is provided with the request of block S124, then the instance UUID of block 3126a and the version UUID of block S126b are the same.

In block S126c, the snapshot request is processed and a snapshot is generated using the UUIDs described above in blocks S126a and S126c.

Figure 1F:
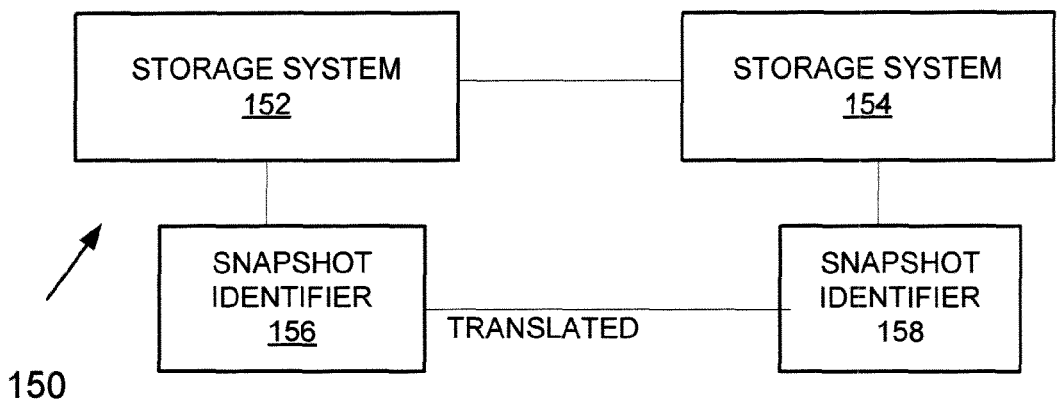
FIG. 1F shows a system for translating a snapshot identifier, according to one embodiment.
Figure 1C:
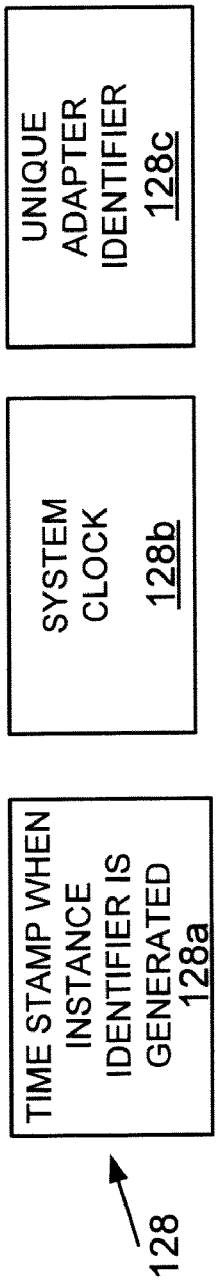
FIG. 1C shows an example of the unique identifier generated in FIG. 1B.
Figure 1C:
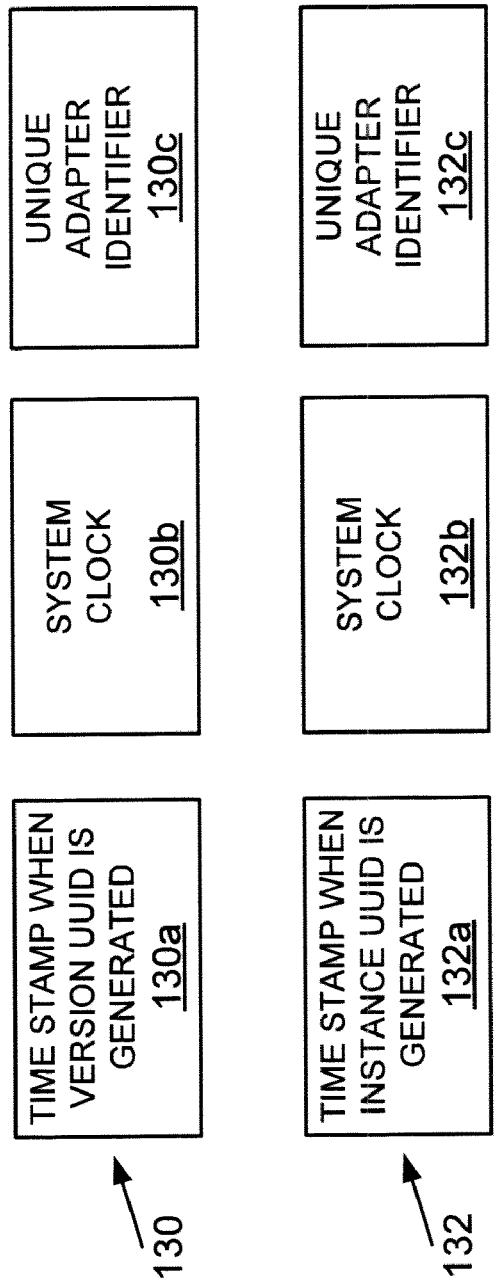

FIG. 1C shows an example of generating an instance UUID and a version UUID for a snapshot. An instance UUID 128 is shown for a non-striped volume. The instance UUID 128 may include three components 128a-128c. Component 128a is a time stamp showing when the instance UUID is being generated. This is created by the operating system 116 that generates the snapshot.

Component 128b is a system clock of the storage system 108 that generates the snapshot. The system clock information is also available to the operating system 116.

Component 128c is a unique address of an adapter that is used by the storage system 108 to communicate with other devices. In one embodiment, the unique address may be a Media Access Control (MAC) address of a network adapter used by the storage system 108 for network communication. The MAC address is typically a globally unique number that may be assigned by a network adapter manufacturer. The MAC address is available to the operating system 116 during storage system 108 initialization.

As explained above, the version UUID for a non-striped storage volume is the same as the instance UUID when a new snapshot is generated. After a snapshot is generated, if the operating system 116 replicates the snapshot, then the replicated snapshot may have the same version UUID as the source snapshot and a different instance UUID.

FIG. 1C also shows a version UUID 130 and an instance UUID 132 for a snapshot of a striped volume. The version UUID 130 may include components 130a-130c. Component 130a includes a time stamp of when the version UUID is created, while components 130b and 130c are similar to 128b and 12bc. Component 130a is generated by operating system 116 because it is aware of its own system clock and can generate a timestamp based on when the version UUID is being created.

The instance UUID 132 may include components 132a-132c. Component 132a also includes a time stamp of when the instance UUID is created, while components 132b and 132c are similar to 128b and 12bc. Component 132a is also generated by operating system 116 because it is aware of its own system clock and can generate a timestamp based on when the instance UUID is being created.

The following example shows how the version UUID and instance UUID are generated when information is stored across a striped volume. Assume that a striped volume X has data stored across three volumes, volume A, volume B and volume C. One of the volumes among the three, for example, volume A may be designated by operating system 116 to operate as a master volume.

When a snapshot of the striped volume is taken, first the version UUID 130 is generated for master volume A. The instance UUID 132 is also generated for the master volume. In one embodiment the version UUID 130 and instance UUID 132 may be the same for the master volume A.

After the master volume A is identified, the snapshot UUID for volumes B and C are generated by operating system 116. The version UUID for volumes B and C is the same as the version UUID of the master volume A, while the instance UUID for volumes B and C are different from that of master volume A.

The UUID scheme described above has numerous advantages. For example, one is not limited to a certain number of snapshots, for example, 255. Furthermore, because identifiers don't have to be recycled, it reduces the chances of renaming or deleting a wrong snapshot because each snapshot is uniquely identified.

Another advantage is that one can universally search for snapshots using the UUID scheme. This makes is easier to manage the snapshots. This is especially useful in a distributed architecture, for example, a cluster environment, where snapshots are stored and managed by multiple nodes in a network environment.

Figure 1D:
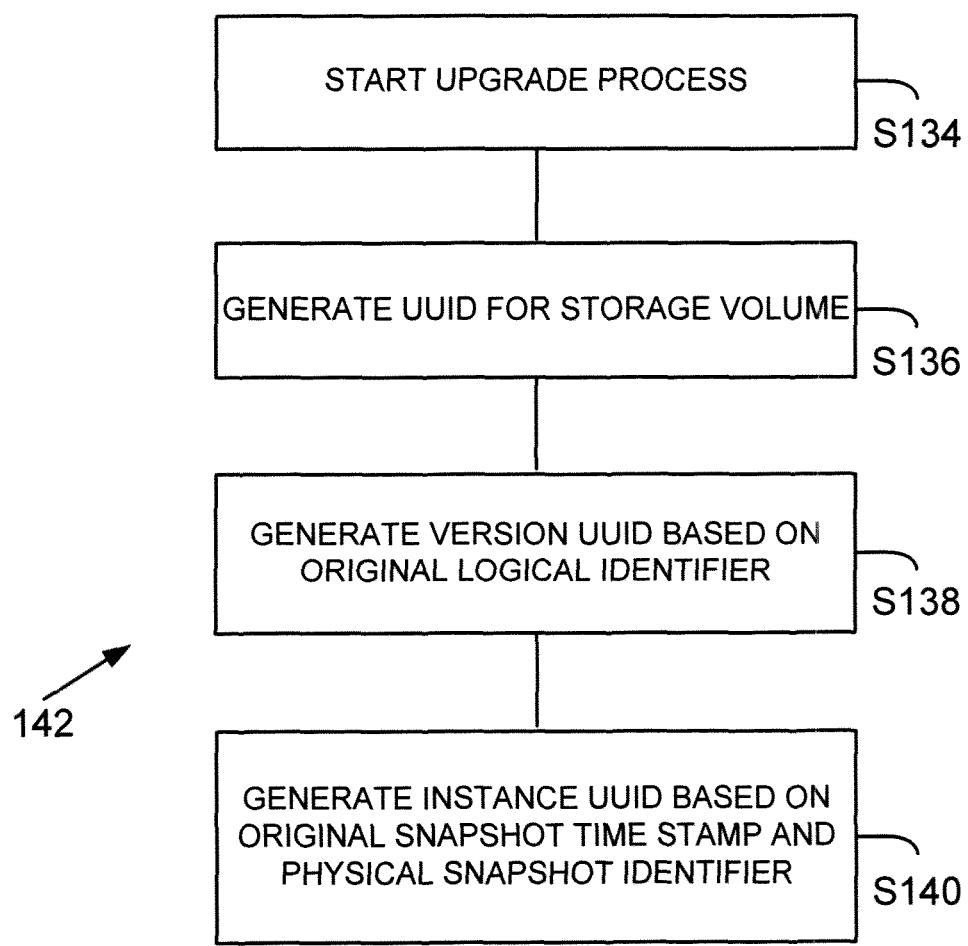
FIG. 1D shows a process flow diagram for upgrading a snapshot with a unique identifier, according to one embodiment.

In one embodiment, a method and system is provided for translating a snapshot identifier (or renaming a snapshot) that was generated before the UUID scheme of FIG. 1B was available. A process 142 for translating the snapshot identifier is shown in FIG. 1D. The translation operation maybe a part of an overall upgrade process that starts in block S134 for upgrading a storage volume. The upgrade process may take place when a newer version of operating system 116 is installed or for any other reason. The upgrade process may be requested by an administrator using management console 120 or initiated by any other means.

In block S136, a UUID is first generated for a storage volume that was replicated by the snapshot. An example of the UUID for the storage volume is shown as 144 in FIG. 1E that is described below. Briefly, the UUID includes a timestamp of when the UUID is being created for the storage volume, a system clock of the storage system 108 that renames the snapshot, a unique adapter address and a storage volume identifier.

In block S138, a version UUID (shown as 146 in FIG. 1E and may also be referred to as the first identifier with respect to process 142) for the snapshot is generated using an original logical identifier that was used to identify the original snapshot. The various components of the version UUID are also described below in detail with respect to FIG. 1E.

In block S140, an instance UUID (shown as 148 in FIG. 1E and may also be referred to as the first identifier with respect to process 142) is generated based on a time stamp of the original snapshot and an original physical snapshot identifier. The details of the instance UUID are also described below in detail with respect to FIG. 1E.

Figure 1E:
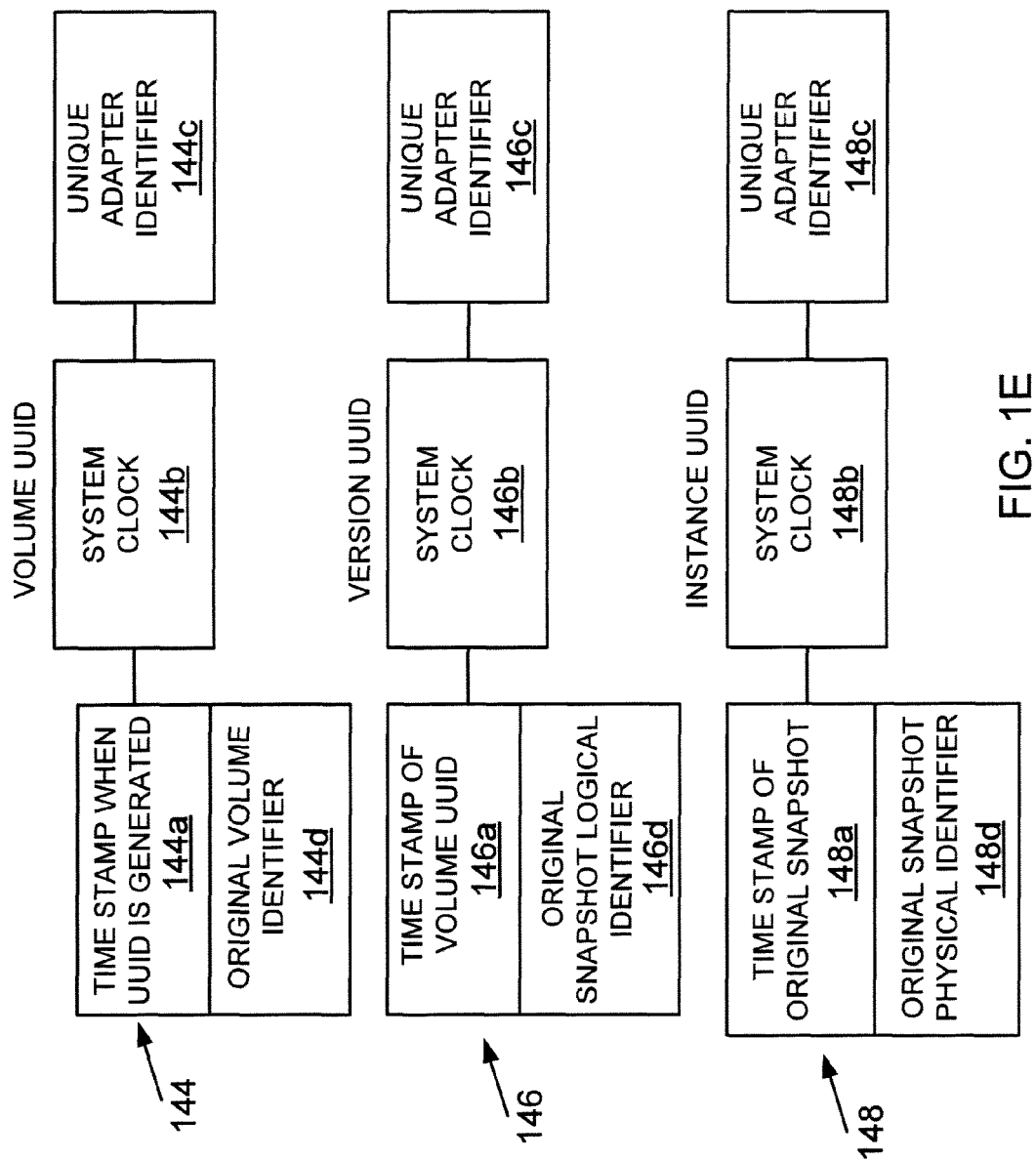
FIG. 1E shows an example of the unique identifiers generated by the process of FIG. 1D.

FIG. 1E shows examples of a storage volume UUID 144 generated in block S136, a version UUID 146 generated in block S138, and an instance UUID 148 generated in block S140 of FIG. 1D for a storage volume that was replicated before the UUID scheme of the present disclosure were introduced. Information from a snapshot table 408 shown in FIG. 4 and described below in detail is taken to generate the UUIDs of FIG. 1E.

The storage volume UUID 144 may include components 144a-144d. Component 144a is a timestamp showing a time when the UUID for the storage volume is created. This component may be generated by operating system 116 that has access to system level information, including time and clock information. Component 144b is the system clock similar to 128b (FIG. 1C) and component 144c is the adapter identifier similar to 128c (FIG. 1C).

Component 144d includes an original volume identifier that identifies the storage volume prior to the upgrade process. The volume identifier is used by operating system 116 to identify the storage volume.

The version UUID 146 includes components 146a-146d. Component 146a includes the same timestamp value as component 144a. Components 146b and 146c are also similar to components 144b and 144c, having the same clock and adapter identifier.

Component 146d is created by replacing the original volume identifier 144d with a logical snapshot identifier (shown as 400 in FIG. 4) when the snapshot was previously created. This logical snapshot identifier may be based on an assigned value of 1-255 as described above. The logical snapshot identifier 146d may be used by a cluster based system. For a non-cluster based system, a physical snapshot identifier having a value of 1-255 may be used to create component 146d because a non-cluster based system may not use a logical snapshot identifier and instead uses the physical snapshot identifier.

The instance UUID 148 includes components 148a-148d. Component 148a is derived by replacing component 144a with the original timestamp of the snapshot. This information may be obtained by the operating system 116 from field 404 of snapshot table 408 (or data structure 408) as shown in FIG. 4 and described below in detail. Component 148b and 148c are the same as 144b and 144c. Component 144d is based on the original physical snapshot identifier. The physical identifier is assigned by operating system 116 when the snapshot was created and may be from 1-255.

FIG. 1F shows a system 150 for translating a snapshot identifier 156 using the process flow of FIG. 1D. System 150 includes a first storage system 152, which may be a legacy system that uses the traditional naming scheme using identifiers from 1-255. Storage system 154 translates the identifier 156 to identifier 158 that has been described above with respect to FIGS. 1D/1E. It is noteworthy that the storage system 154 may an upgraded storage system 152 that includes the capability of using the UUID scheme described above.

The embodiments described above allow one to rename previously taken snapshots (or translate snapshot identifiers) to the UUID format. The translation retains information from the original identifiers while uniquely identifying the snapshots using the UUID format. This allows a storage administrator to name new snapshots and the old snapshots under the same UUID scheme. This allows a storage administrator to better manage the snapshots using the UUID scheme without losing snapshot identifier information that was prevalent prior to the UUID scheme.

The process flow diagrams described above may be used and implemented in a cluster based storage system that is now described below in detail.

Figure 2:
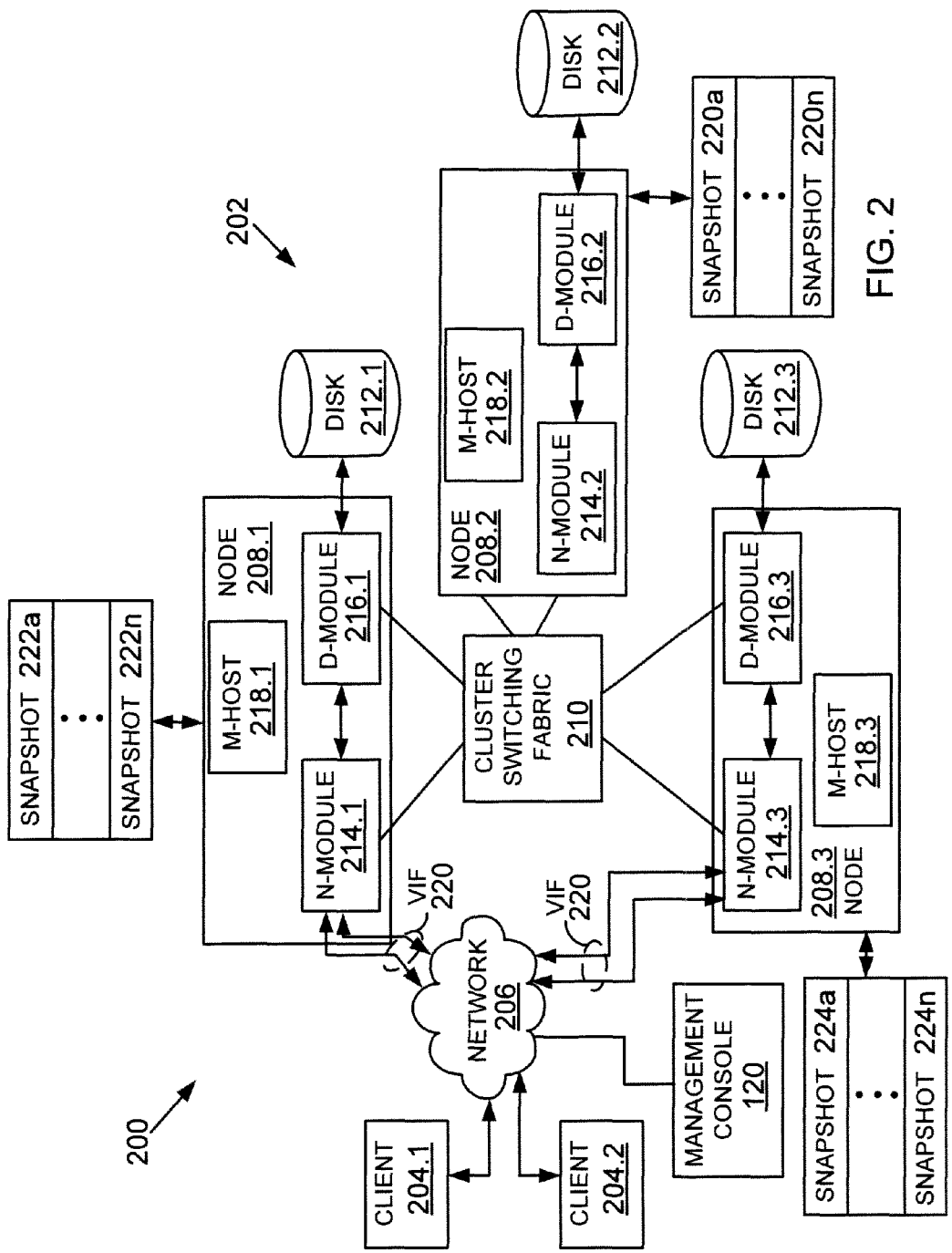
FIG. 2 shows an example of a storage environment with a cluster system, according to one embodiment.

Clustered System:

FIG. 2 shows a cluster based storage system 202 (may also be referred to as "clustered storage system 202" or simply as cluster 202) in a storage environment 200. Cluster 202 is a scalable, distributed architecture that stores data containers at different storage devices that are managed by a plurality of nodes.

Snapshots 220a-220n, 222a-22n and 224a-224n may be stored within cluster 202 across multiple volumes, including striped volumes. The new snapshots may be named using the process flow of FIG. 1B/1C or upgraded based on the process of FIG. 1D/1E that is also described above.

Storage environment 200 may also include a plurality of client systems 204.1-204.2 (may also be referred to as client(s) 204), management console 120 and at least one computer network 206 (similar to network 106) communicably connecting the client systems 204.1-204.2 and the clustered storage system 202.

The clustered storage system 202 includes a plurality of nodes 208.1-208.3 (may also be referred to as 208, a cluster switching fabric 210, and a plurality of mass storage devices such as disks 212.1-212.3 (may also be referred to as disks 212 (similar to storage 112). Each of the plurality of nodes 208.1-208.3 in the clustered storage system 202 provides the functionality of a storage server.

Each of the plurality of nodes 208.1-208.3 may be configured to include an N-module, a D-module, and an M-host, each of which can be implemented as a separate software module. Specifically, node 208.1 includes an N-module 214.1, a D-module 216.1, and an M-host 218.1; node 208.2 includes an N-module 214.2, a O-module 216.2, and an M-host 218.2; and node 208.3 includes an N-module 214.3, a D-module 216.3, and an M-host 218.3.

The N-modules 214.1-214.3 (may also be referred to as 214) include functionality that enables the respective nodes 208.1-208.3 to connect to one or more of the client systems 204.1-204.2 over the computer network 206, while the D-modules 216.1-216.3 (may also be referred to as 216) connect to one or more of the disks 212.1-212.3. The M-hosts 218.1-218.3 (may also be referred to as 218) provide management functions for the clustered storage server system 202.

A switched virtualization layer including a plurality of virtual interfaces (VIFs) (may also be referred to a logical interfaces (LIFs)) 220 is provided between the respective N-modules 214.1-214.3 and the client systems 204.1-204.2, allowing the disks 212.1-212.3 associated with the nodes 208.1-208.3 to be presented to the client systems 204.1-204.2 as a single shared storage pool.

In one embodiment, the clustered storage system 202 can be organized into any suitable number of virtual servers (also referred to as "vservers"), in which each vserver represents a single storage system namespace with separate network access. Each vserver is associated with one or more VIFs and can span one or more physical nodes, each of which can hold one or more VIFs and storage associated with one or more vservers. Client systems can access the data on a vserver from any node of the clustered system.

Each of the nodes 208.1-208.3 is defined as a computer adapted to provide application services to one or more of the client systems 204.1-204.2. In this context, a vserver is an instance of an application service provided to a client system. The nodes 208.1-208.3 are interconnected by the switching fabric 210, which, for example, may be embodied as a Gigabit Ethernet switch. Although FIG. 2 depicts an equal number (i.e., 3) of the N-modules 214.1-214.3, the D-modules 216.1-216.3, and the M-Hosts 218.1-218.3, any other suitable number of N-modules, D-modules, and M-Hosts may be provided. There may also be different numbers of N-modules, D-modules, and/or M-Hosts within the clustered storage server system 202. For example, in alternative embodiments, the clustered storage server system 202 may include a plurality of N-modules and a plurality of D-modules interconnected in a configuration that does not reflect a one-to-one correspondence between the N-modules and D-modules.

The clustered storage server system 202 can include the NETAPP® DATA ONTAP® storage operating system, available from NetApp, Inc., that implements the WAFL® storage system, or any other suitable storage operating system.

The client systems 204.1-204.2 of FIG. 2 may be implemented as general-purpose computers configured to interact with the respective nodes 208.1-208.3 in accordance with a client/server model of information delivery. Each client system 204.1, 204.2 may request the services of one of the respective nodes 208.1, 208.2, 208.3, and that node may return the results of the services requested by the client system by exchanging packets over the computer network 206, which may be wire-based, optical fiber, wireless, or any other suitable combination thereof. The client systems 204.1-204.2 may issue packets according to file-based access protocols, such as the NFS protocol or the CIFS protocol, when accessing information in the form of files and directories.

In a typical mode of operation, one of the client systems 204.1-204.2 transmits an NFS or CIFS request for data to one of the nodes 208.1-208.3 within the clustered storage server system 202, and the VIF 220 associated with the respective node receives the client request. It is noted that each VIF 220 within the clustered system 202 is a network endpoint having an associated IP address, and that each VIF can migrate from N-module to N-module.

The following provides a description of a storage operating system that may be used in storage environment 100 and 200, according to one embodiment.

Figure 3:
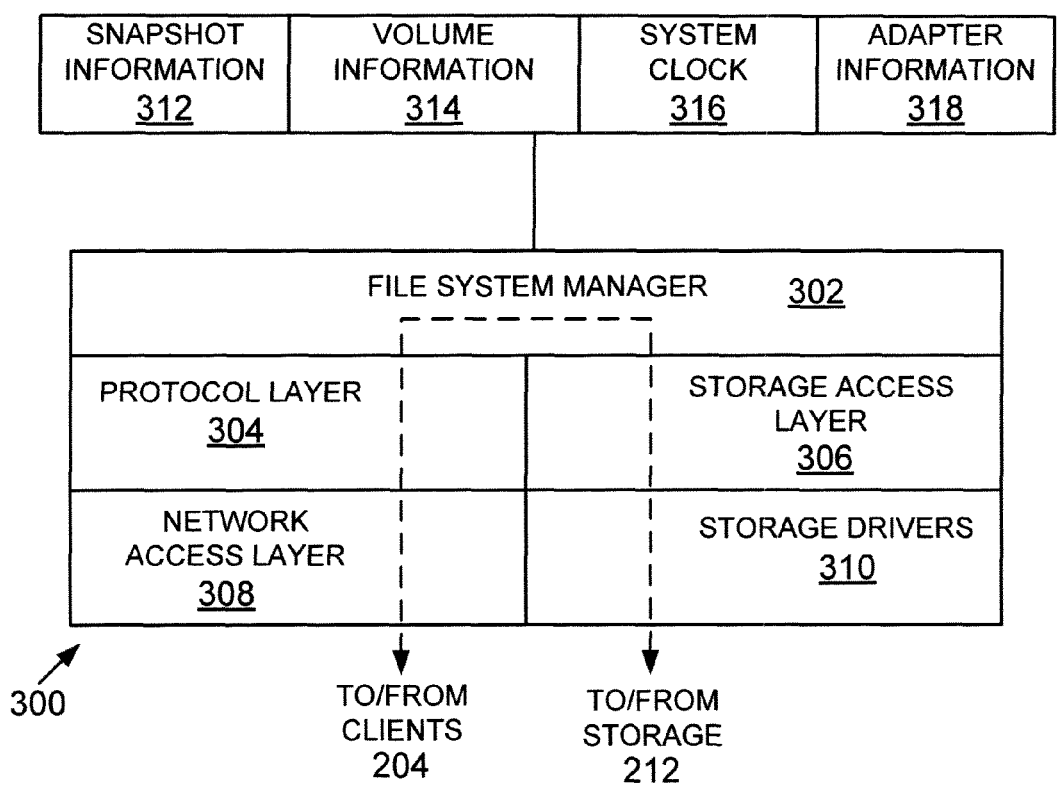
FIG. 3 shows an example of a storage operating system, used according to one embodiment.

Operating System:

FIG. 3 illustrates a generic example of an operating system 300 executed by a node 208.1 (and/or operating system 116 as executed by storage system 108 in a non-cluster based environment, FIG. 1A), according to one embodiment of the present disclosure.

An example of operating system 300 is the DATA ONTAP® (Registered trademark of NetApp, Inc.) operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

Operating system 300 maintains various data structures that are used for implementing the process steps of FIGS. 1B and 1D. For example, snapshot data 312, volume information 314, system clock data 316 and unique adapter address 318.

Snapshot data 312 is maintained by operating system 300 for storing snapshot identifiers as described above. Snapshot data 312 includes version and instance UUIDs.

Volume information 314 is used by operating system 300 for renaming a snapshot as described above with respect to FIGS. 1D and 1E. The volume identifier that is replaced by a snapshot identifier may be included in volume information 314. Volume information 314 may include other data, for example, volume size, volume attributes, permissions, storage path and others.

Operating system 300 may obtain a system clock 316 when it is naming or renaming a snapshot. Such information is typically stored by computing systems and accessible to operating system 300.

The unique adapter address 318 is stored by operating system 300 and is used for uniquely identifying the snapshots, as described above. This information is typically obtained by operating system 300 when a computing system is powered up.

In one example, operating system 300 may include several modules, or "layers" executed by one or both of N-Module 214 and D-Module 216. These layers include a file system manager 302 that keeps track of a directory structure (hierarchy) of the data stored in storage devices and manages read/write operations, i.e. executes read/write operations on disks in response to client 204 requests. File system 302 may maintain the snapshot data 312 and volume information 314.

Operating system 300 may also include a protocol layer 304 and an associated network access layer 308, to allow node 208.1 to communicate over a network with other systems, such as clients 204 and storage management application 118. Protocol layer 304 may implement one or more of various higher-level network protocols, such as NFS, CIFS, Hypertext Transfer Protocol (HTTP), TCP/IP and others, as described below.

Network access layer 308 may include one or more drivers, which implement one or more lower-level protocols to communicate over the network, such as Ethernet. Interactions between clients 204 and mass storage devices 212 are illustrated schematically as a path, which illustrates the flow of data through operating system 300.

The operating system 300 may also include a storage access layer 306 and an associated storage driver layer 310 to allow D-module 216 to communicate with a storage device. The storage access layer 306 may implement a higher-level disk storage protocol, such as RAID while the storage driver layer 310 may implement a lower-level storage device access protocol, such as FC or SCSI.

It should be noted that the software "path" through the operating system layers described above needed to perform data storage access for a client request received at node 208.1 may alternatively be implemented in hardware. That is, in an alternate embodiment of the disclosure, the storage access request data path may be implemented as logic circuitry embodied within a field programmable gate array (FPGA) or an ASIC. This type of hardware implementation increases the performance of the file service provided by node 208.1 in response to a file system request issued by client 204.

As used herein, the term "storage operating system" generally refers to the computer-executable code operable on a computer to perform a storage function that manages data access and may, in the case of a node 208.1, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

FIG. 4 shows an example of a data structure 408 (may also be referred to as snapshot table 408) having a plurality of columns that may be maintained by operating system 300 to store snapshot information prior to being renamed and upgraded by the process flow of FIG. 1D. Snapshot table 408 may be a stand-alone table or integrated with another data structure.

Snapshot data structure 408 may include a plurality of fields' 402-406. Field 400 (ID) may be used to identify a snapshot using the recycled identifiers 1-255. This field is used to populate components 146d and 148b for the version UUID and the instance UUID, respectively, as described above with respect to FIG. 1E. Operating system 300 obtains the value from Field 400 and uses it to generate the version and/or instance UUIDs. Field 402 (NAME) may be used to store the name of a previously created snapshot.

Field 404 (Creation Time) may be used to store the time when the snapshot was taken. This field is used to generate component 148a of the instance UUID as described above.

Field 406 (ATTR) may be used to store attribute information regarding a snapshot. For example, field 406 may include a snapshot version indicator indicating a snapshot when a change in status for the data container was discovered.

Striped Volume:

FIG. 5 shows an example of a striped volume 500 that may be used to store snapshots that are named based on the process steps described above. A striped volume may include a plurality of stripes shown as stripe 1-stripe n. Each stripe may store information that is located at a plurality of storage devices, shown as disk 1-disk n. For example, a snapshot may be stored among multiple stripes, spanning multiple disks 1-n.

Snapshots for a stripe may involve multiple volumes. As described above, one of the volumes from among the multiple volumes is designated as a master volume. The version UUID for the master volume and the other volumes is the same. The instance identifier of the different volumes is different.

Figure 6:
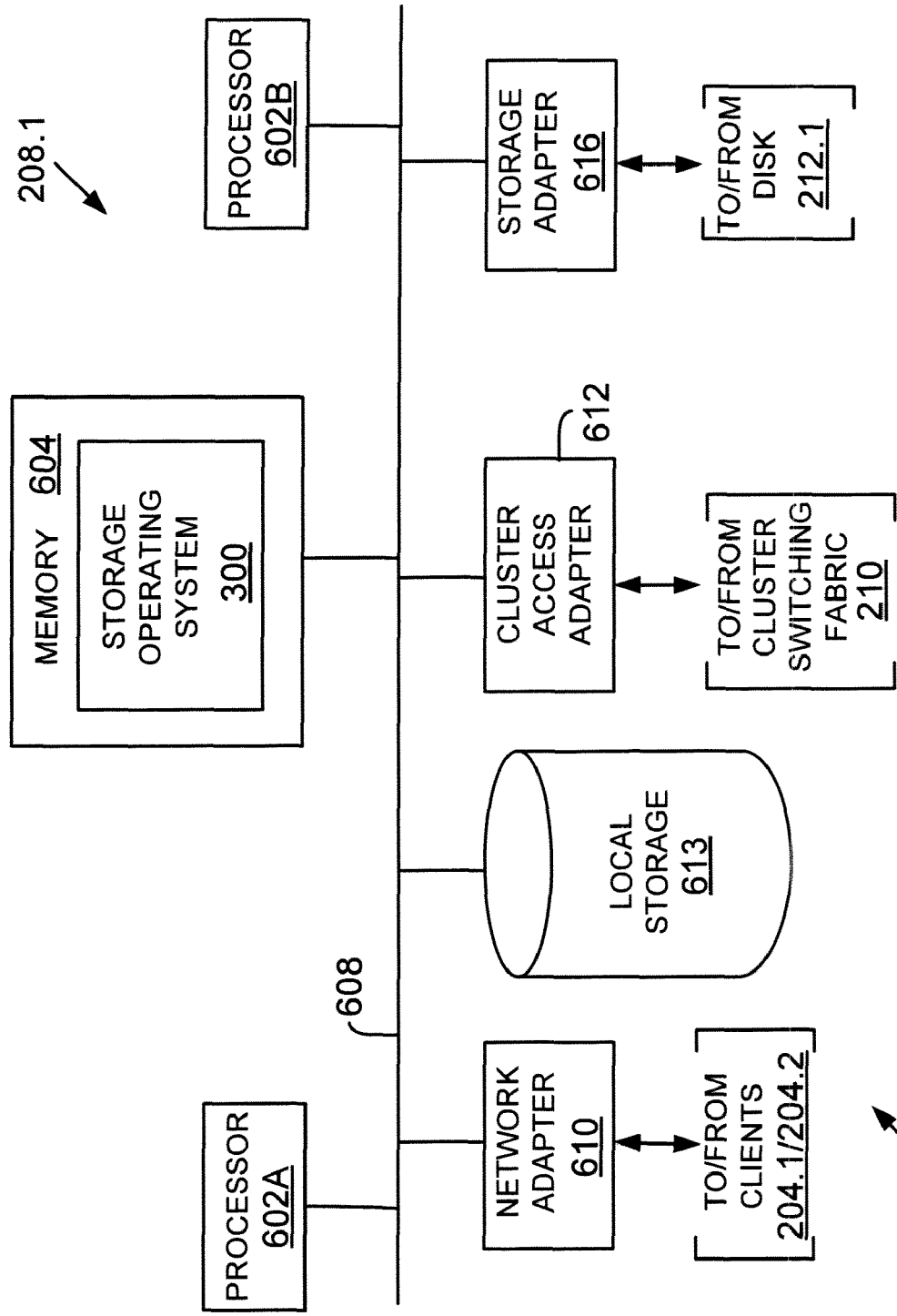
FIG. 6 shows an example of a node used in a cluster system, according to one embodiment.

Storage System Node:

FIG. 6 is a block diagram of a node 208.1 (FIG. 2) that is illustratively embodied as a storage system comprising of a plurality of processors 602A and 602B, a memory 604, a network adapter 610, a cluster access adapter 612, a storage adapter 616 and local storage 613 interconnected by a system bus 608. The local storage 613 comprises one or more storage devices, such as disks, utilized by the node to locally store configuration information.

The cluster access adapter 612 comprises a plurality of ports adapted to couple node 208.1 to other nodes of cluster 202. The cluster access adapter may have a unique identifier (for example, a MAC address) that is obtained by operating system 300 and stored as data structure 318. This information is used to populate 128c, 130c, 132c, 144c, 146c and 148c components of the UUIDs that have been described above in detail.

In the illustrative embodiment, Ethernet may be used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 612 is utilized by the N/D-module for communicating with other N/D-modules in the cluster 202.

Each node 208.1 is illustratively embodied as a dual processor storage system executing a storage operating system 606 that preferably implements a high-level module, such as a file system, to logically organize the information as a hierarchical structure of named directories, files and special types of files called virtual disks (hereinafter generally "blocks") on disks 212.1. However, it will be apparent to those of ordinary skill in the art that the node 208.1 may alternatively comprise a single or more than two processor systems. Illustratively, one processor 602A executes the functions of the N-module 214.1 on the node, while the other processor 602B executes the functions of the D-module 216.1.

The memory 604 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the invention described herein.

The storage operating system 300, portions of which is typically resident in memory and executed by the processing elements, functionally organizes the node 208.1 by, inter alia, invoking storage operations in support of the storage service implemented by the node.

The network adapter 610 comprises a plurality of ports adapted to couple the node 208.1 to one or more clients 204.1/204.2 over point-to-point links, wide area networks, virtual private networks implemented over a public network (Internet) or a shared local area network. The network adapter 610 thus may comprise the mechanical, electrical and signaling circuitry needed to connect the node to the network. Illustratively, the computer network 106 may be embodied as an Ethernet network or a Fibre Channel (FC) network.

The storage adapter 616 cooperates with the storage operating system 300 executing on the node 208.1 to access information requested by the clients. The storage adapter 616 comprises a plurality of ports having input/output (I/O) interface circuitry that couples to storage devices over an I/O interconnect arrangement, such as a conventional high-performance, FC link topology.

Figure 7:
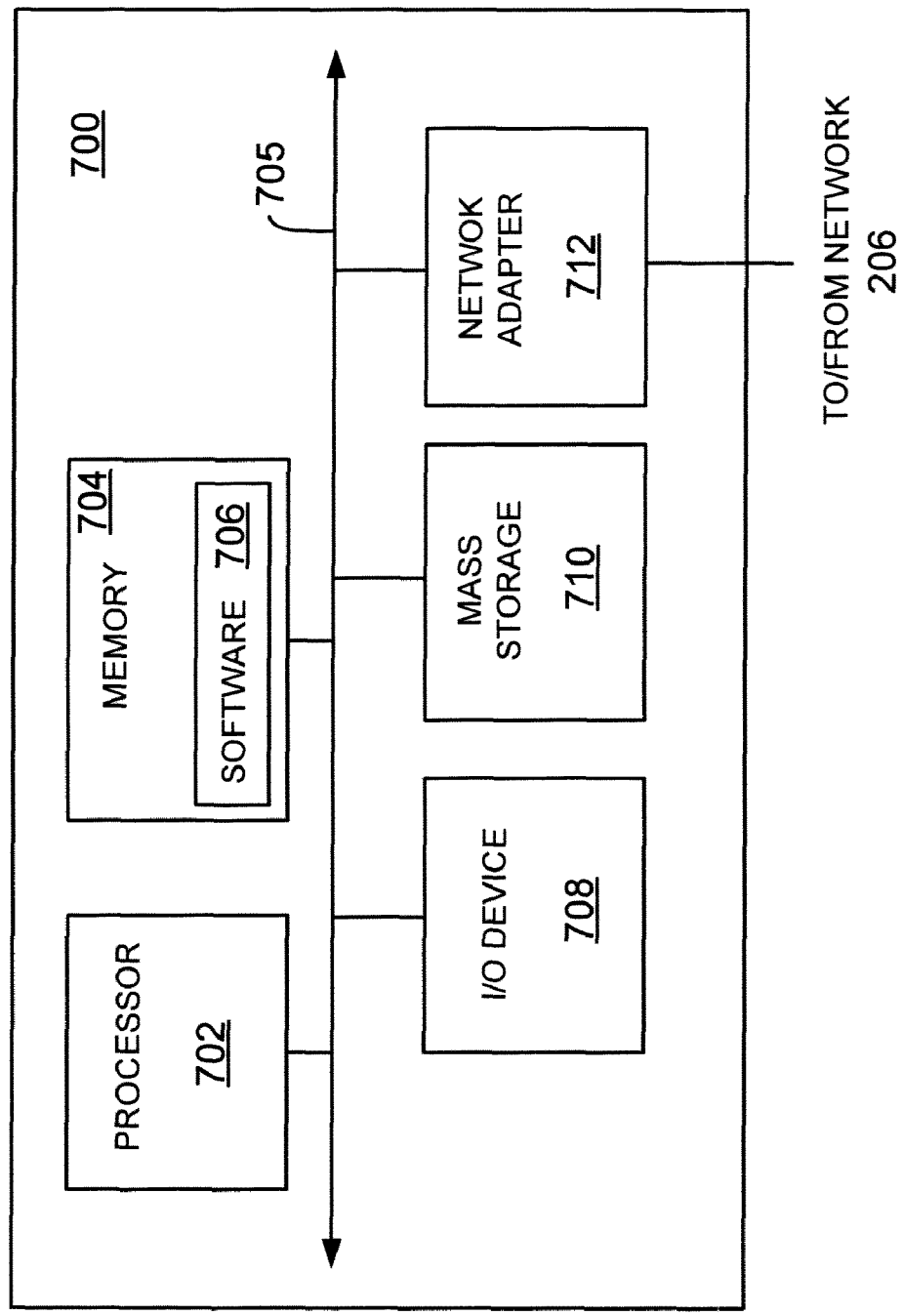
FIG. 7 shows an example of a computing system for implementing the process steps of the present disclosure.

Processing System:

FIG. 7 is a high-level block diagram showing an example of the architecture of a processing system, at a high level, in which the executable instructions described above can be implemented. The processing system 700 can represent management console 120, client 104 and storage system 108. Note that certain standard and well-known components which are not germane to the present invention are not shown in FIG. 7.

The processing system 700 includes one or more processors 702 and memory 704, coupled to a bus system 705. The bus system 705 shown in FIG. 7 is an abstraction that represents any one or more separate physical buses and/or point-to-point connections, connected by appropriate bridges, adapters and/or controllers. The bus system 705, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 702 are the central processing units (CPUs) of the processing system 700 and, thus, control its overall operation. In certain embodiments, the processors 702 accomplish this by executing executable instructions 706 stored in memory 704. A processor 702 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 704 represents any form of random access memory (RAM), read-only memory (ROM), flash memory, or the like, or a combination of such devices. Memory 704 includes the main memory of the processing system 700. Instructions 706 may be used to implement the techniques introduced above and may reside in and executed (by processors 702) from memory 704.

Also connected to the processors 702 through the bus system 705 are one or more internal mass storage devices 710, and a network adapter 712. Internal mass storage devices 710 may be or may include any conventional medium for storing large volumes of data in a non-volatile manner, such as one or more magnetic or optical based disks.

The network adapter 712 provides the processing system 700 with the ability to communicate with remote devices (e.g., storage servers 202) over a network and may be, for example, an Ethernet adapter, a Fibre Channel adapter, or the like. The processing system 700 also includes one or more input/output (I/O) devices 708 coupled to the bus system 705. The I/O devices 708 may include, for example, a display device, a keyboard, a mouse, etc.

Cloud Computing:

The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. The storage systems described above can be a part of the server layer for providing storage services. Details regarding these layers are not germane to the inventive embodiments.

Thus, a method and apparatus for naming and renaming snapshots have been described. Note that references throughout this specification to "one embodiment" or "an embodiment" mean that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A machine implemented method for translating an identifier of a replicated copy of a storage volume, comprising:

providing a unique identifier for the storage volume having a time stamp value based on when the unique identifier is being generated, an original identifier that identifies the storage volume of the replicated copy, a system clock of a storage system managing the storage volume, and a unique address of an adapter used by the storage system;

generating a first identifier for the replicated copy derived from the unique identifier for the storage volume by replacing the original identifier of the storage volume with an original logical identifier for the replicated copy; and identifying the replicated copy with a second identifier derived from the unique identifier of the storage volume by replacing the original identifier of the storage volume with an original physical identifier of the replicated copy and replacing the time stamp of the unique storage volume identifier with an original time stamp of the replicated copy.

2. The method of claim 1, wherein the replicated copy is a snapshot.

3. The method of claim 1, wherein an original physical identifier is used to replace the original volume identifier for the first identifier of the replicated copy in a non-cluster based storage system.

4. The method of claim 1, wherein the replicated copy is in a cluster based storage environment.

5. The method of claim 1, wherein the unique address of the adapter is a media access control (MAC) address of the adapter.

6. The method of claim 1, wherein the first identifier is a version identifier and the second identifier is an instance identifier.

7. The method of claim 1, wherein the operating system for the storage system maintains a data structure having the original logical identifier for the replicated copy and the original time stamp of the replicated copy.

8. A machine implemented method for translating an identifier of a replicated copy of a storage volume, comprising:

generating a first identifier for the replicated copy having an original logical identifier of the replicated copy; a time stamp based on when a unique identifier for the storage volume is generated, a system clock for the storage system accessing the storage volume, and a unique address of an adapter used by the storage system; and using an original physical identifier of the replicated copy and an original time stamp of the replicated copy for identifying the replicated copy with a second identifier.

9. The method of claim 8, wherein the replicated copy is a snapshot.

10. The method of claim 8, wherein an original physical identifier is used for the first identifier of the replicated copy in a non-cluster based storage system.

11. The method of claim 8, wherein the replicated copy is in a cluster based storage environment.

12. The method of claim 8, wherein the unique address of the adapter is a media access control (MAC) address of the adapter.

13. The method of claim 8, wherein the first identifier is a version identifier and the second identifier is an instance identifier.

14. The method of claim 8, wherein the operating system for the storage system maintains a data structure having the original logical identifier for the replicated copy and the original time stamp of the replicated copy.

15. The method of claim 8, wherein the first identifier is derived from the unique identifier for the storage volume having the time stamp based on when the unique identifier is generated, an original identifier that identifies the storage volume of the replicated copy, a system clock of the storage system, and the unique address of the adapter.

16. The method of claim 15, wherein the original identifier of the storage volume is replaced by the original logical identifier for the replicated copy for generating the first identifier.

17. The method of claim 8, wherein the second identifier is derived from the unique identifier for the storage volume having the time stamp based on when the unique identifier is generated, an original identifier that identifies the storage volume of the replicated copy, a system clock of the storage system, and the unique address of the adapter.

18. The method of claim 17, wherein the original identifier of the storage volume is replaced by the original physical identifier of the replicated copy and the time stamp of the unique storage volume identifier is replaced by the original time stamp of the replicated copy for generating the second identifier.

19. A machine implemented method for uniquely identifying a replicated copy of a storage volume, comprising:
    providing a first component of a unique identifier having a time stamp value indicating a time when the unique identifier is being generated;
    using a system clock value generated by a storage system that manages the replicated copy for identifying a second component of the unique identifier; and
    generating a third component of the unique identifier having a unique address of a network adapter used by the storage system.

20. The method of claim 19, wherein the replicated copy is a snapshot.

21. The method of claim 19, wherein the replicated copy is in a cluster based storage environment.

22. The method of claim 19, wherein the unique address of the adapter is a media access control (MAC) address of the adapter.

23. A system for translating an identifier of a replicated copy of a storage volume, comprising:
    a first storage system identifying the replicated copy using an original logical identifier of the replicated copy and an original physical identifier of the replicated copy; and
    a second storage system translating the identifier of the replicated copy to generate a first identifier for the replicated copy having the original logical identifier of the replicated copy; a time stamp based on when a unique identifier for the storage volume is generated, a system clock for the second storage system and a unique address of an adapter used by the second storage system; and using the original physical identifier of the replicated copy and the original time stamp of the replicated copy for generating a second identifier for the replicated copy.

24. The system of claim 23, wherein the first identifier is derived from the unique identifier for the storage volume having the time stamp based on when the unique identifier is generated, an original identifier that identifies the storage volume of the replicated copy, the system clock of the second storage system, and the unique address of the adapter.

25. The system of claim 24, wherein the original identifier of the storage volume is replaced by the original logical identifier for the replicated copy for generating the first identifier.

26. The system of claim 23, wherein the second identifier is derived from the unique identifier for the storage volume having the time stamp based on when the unique identifier is generated, an original identifier that identifies the storage volume of the replicated copy, the system clock of the second storage system, and the unique address of the adapter.

27. The system of claim 26, wherein the original identifier of the storage volume is replaced by the original physical identifier of the replicated copy and the time stamp of the unique storage volume identifier is replaced by the original time stamp of the replicated copy for generating the second identifier.

\* \* \* \* \*